US006630538B1

(12) United States Patent
Ellul et al.

(10) Patent No.: US 6,630,538 B1
(45) Date of Patent: Oct. 7, 2003

(54) POLYPROPYLENE THERMOPLASTIC ELASTOMER COMPOSITIONS HAVING IMPROVED PROCESSING PROPERTIES AND PHYSICAL PROPERTY BALANCE

(76) Inventors: Maria D. Ellul, 3230 N. Dover Rd., Silver Lake Village, OH (US) 44224; Prasadarao Meka, 2730 Sandpepple Dr., Seabrook, TX (US) 77586; Kang-Bo Wang, 263 Brookrun, Copley, OH (US) 44321; Yu-Feng Wang, 15907 Moonrock Dr., Houston, TX (US) 77062

( * ) Notice: Subject to any disclaimer, the term of this patent is extended or adjusted under 35 U.S.C. 154(b) by 0 days.

(21) Appl. No.: 09/674,654

(22) PCT Filed: May 13, 1999

(86) PCT No.: PCT/US99/10569

§ 371 (c)(1),
(2), (4) Date: Aug. 31, 2001

(87) PCT Pub. No.: WO99/64510

PCT Pub. Date: Dec. 16, 1999

(51) Int. Cl.[7] ............................ C08L 23/16; C08L 23/26

(52) U.S. Cl. ...................... 525/194; 525/196; 525/232; 525/240; 524/525; 524/528

(58) Field of Search ................. 525/194, 196, 525/232, 240; 524/525, 528

(56) References Cited

U.S. PATENT DOCUMENTS 5,786,403 A * 7/1998 Okada et al. ................ 521/134
6,245,856 B1 * 6/2001 Kaufman et al. ........... 525/240

FOREIGN PATENT DOCUMENTS

WO            WO96/35371     * 11/1996

* cited by examiner

Primary Examiner—Nathan M. Nutter

(57) ABSTRACT

Thermoplastic elastomer compositions having improved processabillity while maintaining good physical properties are prepared from a mixture of olefinic rubber and a polypropylene composition having a melt flow rate in the range of from about 0.5 to about 5 dg/min. and a molecular weight distribution Mw/Mn of greater than 5.5 up to about 20. The rubber component of the mixture may be at least partially cured by dynamic vulcanization.

11 Claims, No Drawings

POLYPROPYLENE THERMOPLASTIC ELASTOMER COMPOSITIONS HAVING IMPROVED PROCESSING PROPERTIES AND PHYSICAL PROPERTY BALANCE

BACKGROUND OF THE INVENTION

1. Field of the Invention

The present invention relates generally to thermoplastic elastomer compositions comprising a blend of polypropylene polymeric and at least partially cured or non-cured elastomer having both improved processability and good physical properties.

2. Description of the Prior Art

A thermoplastic elastomer is generally defined as a polymer or blend of polymers that can be processed and recycled in the same way as a conventional thermoplastic material, yet has properties and performance similar to that of vulcanized rubber at service temperatures. Blends or alloys of plastic and elastomeric rubber have become increasingly important in the production of high performance thermoplastic elastomers, particularly for the replacement of thermoset rubber in various applications.

Polymer blends which have a combination of both thermoplastic and elastic properties are generally obtained by combining a thermoplastic polymer with an elastomeric composition in a way such that the elastomer is intimately and uniformly dispersed as a discrete particulate phase within a continuous phase of the thermoplastic. Early work with vulcanized compositions is found in U.S. Pat. No. 3,037.954, which discloses static vulcanization as well as the technique of dynamic vulcanization wherein a vulcanizable elastomer is dispersed into a resinous thermoplastic polymer and the elastomer is cured while continuously mixing and shearing the polymer blend. The resulting composition is a microgel dispersion of cured elastomer, such as EPDM rubber, butyl rubber, chlorinated butyl rubber, polybutadiene or polyisoprene in an uncured matrix of thermoplastic polymer such as polypropylene.

Depending on the ultimate application, such thermoplastic elastomer (TPE) compositions may comprise one or a mixture of thermoplastic materials such as propylene homopolymers and propylene copolymers and like thermoplastics used in combination with one or a mixture of cured or non-cured elastomers such as ethylene/propylene rubber, EPDM rubber, diolefin rubber, butyl rubber or similar elastomers. TPE compositions may also be prepared where the thermoplastic material used also includes an engineering resin having good high temperature properties, such as a polyamide or a polyester used in combination with a cured or non-cured elastomer. Examples of such TPE compositions and methods of processing such compositions, including methods of dynamic vulcanization, may be found in U.S. Pat. Nos. 4,130,534: 4,130,535; 4,594,390; 5,177,147; and 5,290,886, as well as in WO 92/02582.

TPE compositions are normally melt processed using conventional thermoplastic molding equipment such as by injection molding, compression molding. extrusion, blow molding or other thermoforming techniques. In such TPE compositions, the presence of the elastomeric component does not necessarily improve the processability of the composition. In fact, where the elastomeric component is partially or fully cured (cross-linked) in situ during the mixing of the TPE polymer components (dynamically vulcanized), or where a dynamically vulcanized TPE composition is further processed, there are heavier demands placed upon processing machinery as compared with the processing of a thermoplastic composition which is free of cured elastomer. Polypropylenes normally used as a thermoplastic component in TPE compositions are conventional Ziegler/Natta catalyzed crystalline polymers having a melt flow rate in the range of about 0.7 to 5 dg/min. and a molecular weight distribution (Mw/Mn) of from about 3 to about 4. However, TPE compositions containing these materials are difficult to process.

Conventional methods for improving processability or flow in TPE compositions containing polypropylene involve either a reduction in the cure state where the TPE is vulcanized, the use of a polypropylene component having a relatively low molecular weight (and thus a relatively high melt flow rate) and the addition of high levels of diluent processing oil to the composition. Unfortunately, while each of these techniques do provide some improvement in processability, a penalty is paid in terms of a diminishment in certain physical properties of the composition resulting in lower mechanical properties, e.g., tensile strength, elongation, toughness, modulus and heat distortion temperature. Elasticity as measured by tension set and compression set may also be compromised.

SUMMARY OF THE INVENTION

The present invention provides a thermoplastic elastomer composition comprising a mixture of a polypropylene polymer composition having a melt flow rate in the range of from about 0.5 to about 5 dg/min and a molecular weight distribution Mw/Mn of greater than 5.5 up to about 20; and an olefinic rubber, wherein said olefinic rubber is present in said composition at a level of about 10 to 90 wt % based on the total polymer content of said composition.

The invention is based on the discovery that the utilization of polypropylene polymer composition having melt flow rate (MFR) and molecular weight distribution (MWD) values within the above-described parameters gives rise to thermoplastic elastomer compositions (TPEs), including dynamically vulcanized compositions (DVAs), which are more processable than TPEs containing conventional polypropylenes having an MFR in the range of 0.7 to 5 and MWD of about 3 to 4. Because of this improved processability, conventional techniques for improving processability which detract from physical properties of the composition, e.g., inclusion of high levels of processing oil or use of high MFR polypropylene as the polypropylene component of the composition, can be avoided.

DETAILED DESCRIPTION OF THE INVENTION

Following is a description of the various ingredients which may be used to formulate the TPE compositions of this invention.

Polypropylene Composition

Polypropylene compositions suitable for use in the present invention have a melt flow rate (MFR) from about 0.5 to about 5 dg/min., more preferably from about 0.5 to 4 dg/min., and a molecular weight distribution of greater than 5.5 up to about 20, more preferably from about 6 to about 15. Molecular weight distribution or polydispersity, is defined as the weight average molecular weight (Mw) divided by the number average molecular weight (Mn) of the polypropylene composition. Mw and Mn of the polypropylene may be determined either using Gel Permeation Chromatography (GPC) or by rheology as described in Zeichner et al. "A Comprehensive Evaluation of Polypropylene Melt Rheology," Proc. $2^{nd}$ World Congress, Chem. Eng., Vol. 6, pp. 333–337 (1981). Polypropylenes having MFR values within the above parameters as measured by either GPC or rheology are suitable for use in this invention. MFR is a measure of the ability of the polymer to flow and is reported as dg/min. MFR is determined in accordance with ASTM D 1238 (condition L). Polypropylenes suitable for use herein may be made using conventional Ziegler Natta, metallocene or mixed metallocene catalysts by conventional solution or gas phase reactor polymerization processes. Because it is difficult to adjust polymerization conditions in a single reactor to produce polypropylene having both an MFR in the 0.5 to 5 dg/min. range and an average MWD of greater than 5.5 up to 20, the polypropylene is more readily prepared by blending at least two different grades of polypropylene, one having an MFR of less than 0.5 dg/min. and at least one other having an MFR greater than 3 dg/min. Alternatively, polypropylene compositions meeting the above parameters may be prepared from a mixture of three polypropylenes, one having an MFR less than 1 dg/min., a second having an MFR greater than 1 dg/min. and a third having an MFR greater than 4 dg/min. These mixtures may be prepared by combining polypropylenes prepared in separate reactors under differing polymerization conditions or by sequential polymerization of monomer in at least two separate reactor zones wherein differing polymerization conditions in each zone favor the production of polypropylene having different MFR and MWD properties.

Metallocene catalysts which may be used to polymerize polypropylenes used in this invention are one or more compounds represented by the formula $Cp_m M_n X_q$ wherein Cp is a cyclopentadienyl ring which may be substituted, or derivative thereof which may be substituted, M is a Group 4, 5, or 6 transition metal, for example, titanium, zirconium, hafnium, vanadium, niobium, tantalum, chromium, molybdenum and tungsten. R is a hydrocarbyl group or hydrocarboxy group having from one to 20 carbon atoms, X is a halogen, and m=1–3, n=0–3, q=0–3, and the sum of m+n+q is equal to the oxidation state of the transition metal.

Methods for making and using matallocenes in polymerization reactions are very well known in the art. For example, metallocenes are detailed in U.S. Pat. Nos. 4,530, 914; 4,549,199; 4,769,910; 4,808,561; 4,871,705; 4,933, 403: 4,937,299; 5,017,714; 5,026,798; 5,057,475; 5,190, 867; 5,278,119; 5,304,614; 5,324,800; 5,350,723; and 5,391, 790, each fully incorporated herein by reference.

The Ziegler-Natta catalysts useful in the preparation of polypropylenes of the present invention may be solid titanium supported catalyst systems such as described in U.S. Pat. No. 5,159,021. Briefly, the Ziegler-Natta catalyst can be obtained by: (1) suspending a dialkoxy magnesium compound in an aromatic hydrocarbon that is liquid at ambient temperatures; (2) contacting the dialkoxy magnesium-hydrocarbon composition with a titanium halide and with a diester of an aromatic dicarbocylic acid: and (3) contacting the resulting functionalized dialkoxy magnesium-hydrocarbon composition of step (2) with additional titanium halide.

The Ziegler-Natta co-catalyst is preferably an organoaluminum compound that is halogen free. Suitable halogen free organoaluminum compounds are, in particular, branched unsubstituted alkylaluminum compounds of the formula AIR where R denotes an alkyl radical having 1 to 10 carbon atoms, such as for example, trimethylaluminum, triethylaluminum, triisobutylaluminum and tridiisobutylaluminum. Additional compounds that are suitable for use as a co-catalyst are readily available and amply disclosed in the prior art, including U.S. Pat. No. 4,990,477, which is incorporated herein by reference. The same or different Ziegler-Natta catalyst(s) can be used in both the initial and subsequent polymerization steps.

Electron donors are typically used in two ways in the formation of Ziegler-Natta catalysts and catalyst systems. An internal electron donor may be used in the information reaction of the catalyst as the transition metal halide is reacted with the metal hydride or metal alkyl. Examples of internal electron donors include amines, amides, ethers, esters, aromatic esters, ketones, nitriles, phosphines, stilbenes, arsines, phosphoramides, thioethers, thioesters, aldehydes, alcoholates, and salts of organic acids. In conjunction with an internal donor, an external electron donor is also used in combination with a catalyst. External electron donors affect the level of stereoregularity and MFR in polymerization reactions. External electron donor materials include organic silicon compounds, e.g., tetraethoxysilane and cicyclopentydimethoxysilane. Internal and external type electron donors are described, for example, in U.S. Pat. No. 4,535,068, which is incorporated herein by reference. The use of organic silicon compounds as external electron donors are described, for example, in U.S. Pat. Nos. 4,218, 339; 4,395,360; 4,328,122; and 4,473,660, all of which are incorporated herein by reference.

Polypropylenes suitable for use herein are at least partially crystalline materials having an Mn in the range of about 10,000 to 250,000 and include polypropylene homopolymers as well as reactor copolymers of propylene which can contain about up to about 20 wt % of ethylene or an alphaolefin comonomer of 4 to 16 carbon atoms or mixtures thereof. Thus, the term "polypropylene" as used herein intended to cover both homopolymers and copolymers.

The composition of the invention may also contain one or more other thermoplastic polymer components in addition to the polypropylene component described above. These include other monoolefin polymers or copolymers based on monomers having 2–6 carbon atoms such as ethylene 1-butene, isobutylene, 1-pentene and the like.

Additional Thermoplastic Polymers.

In addition to the polypropylene polymer composition and other polyolefin components, the composition may also contain one or more other thermoplastic polymers selected from the group consisting of polyamides, polyimides, polyesters, polycarbonates, polysulfones, polylactones, polyacetals, acrylontrile/butadiene/styrene copolymer resins, polyphenylene oxides, ethylene/carbon monoxide copolymers, polyphenylene sulfides, polystyrene, styrene/acrylonitrile copolymer resins, styrene/maleic anhydride copolymer resins, aromatic polyketones and mixtures thereof.

Suitable thermoplastic polyamides (nylons) comprise crystalline or resinous, high molecular weight solid polymers including copolymers and terpolymers having recurring amide units within the polymer chain. Polyamides may be prepared by polymerization of one or more epsilon lactams such as caprolactam, pyrrolidione, lauryllactam and aminoundecanoic lactam, or amino acid, or by condensation of dibasic acids and diamines. Both fiber-forming and molding grade nylons are suitable. Examples of such polyamides are polycaprolactam (nylon 6), polylauryllactam (nylon 12), polyhexamethyleneadipamide (nylon-6,6), polyhexamethyleneazelamide (nylon-6,9), polyhexamethylenesebacamide (nylon 6,10), polyhexamethyleneisophthalamide (nylon-6, IP) and the condensation product of 11-amino-undecanoic acid (nylon 11). Commerically available thermoplastic polyamides may be advantageously used in the practice of this invention, with linear crystalline polyamides having a softening point or melting point between 160° C.–230° C. being preferred.

Suitable thermoplastic polyesters which may be employed include the polymer reaction products of one or a mixture of alphatic or aromatic polycarboxylic acids, esters of anhydrides and one or a mixture of diols. Examples of satisfactory polyesters include poly (trans-1,4-cyclohexylene $C_{2-6}$ alkane discarbaoxylates such as poly (trans-1,4-cyclohexylene succinate) and poly (trans-1,4 cyclohexylene adipate);poly (cis or trans-1,4-cyclohexanedimethylene) alkanedicarboxylates such as poly (cis 1,4-cyclohexane-dimethylene) oxylate and poly (cis1, 4-cyclohexanedimethylene) succinate, poly ($C_{2-4}$ alkylene terephthalates) such as polyethyleneterephthalate and polytetramethyleneterephthalate, poly ($C_{2-4}$ alkylene isophthalates) such as pooly ethyleneisophthalate and polyltetramethylene isophthalate and like materials. Preferred polyesters are derived from aromatic dicarboxylic acids such as naphthalenic or phthalic acids and $C_2$ to $C_4$ diols, such as pollyethyilene terephthalate and polybutylene terephthalate. Preferred pollyessters will have a melting point in the range of 160° to 260°.

Poly(phenylene ether) (PPE) thermoplastic engineering resins which may be used in accordance with this invention are well known, commercially available materials produced by the oxidative coupling polymerization of alkyl substituted phenols. They are generally linear polymers having a glass transition temperature in the range of about 190° C. to 235° C. Examples of preferred PPE polymers include poly (2,6-dialkyl-1,4 phenylene ethers) such as poly(2,6 dimethyl-1,4-phenylenether), poly 2-methyl-6-ethyl-1,4 phenylene ether), poly-(2,6-dipropyl-1,4-phenylene ether) and poly (2-ethyl-6-propyl-1,4-phenylene ether). These polymers, their method of preparation and blends with polystyrene are further described in U.S. Pat. No. 3,383,435, the complete disclosure of which is incorporated herein by reference.

Other thermoplastic resins which may be used include the polycarbonate analogs of the polyesters described above such as segmented poly(ether cophthalates); polycaprolactone polymers; styrene resins such as copolymers of styrene with less than 50 mole % of acrylonitrile (SAN) and resinous copolymers of styrene, acrylonitrile and butadiene (ABS); sulfone polymers such as polyphenylsulfone, and like engineering resins as are known in the art.

Olefinic Rubber

Suitable rubbery materials which may be used include monoolefin copolymeric rubbers, isobutylene copolymers and diolefin rubbers, as well as mixtures thereof.

Suitable monoolefin copolymer rubbers comprise nonpolar, essentially non-crystalline, rubbery copolymers of two or more alpha-monoolefins, preferably copolymerized with at least one polyene, usually a diene. Saturated monoolefin copolymer rubber, for example, ethylene-propylene copolymer rubber (EPM) can be used. However, unsaturated monoolefin rubber such as EPDM rubber is more suitable. EPDM is a terpolymer of ethylene, propylene and a non-conjugated diene. Satisfactory non-conjugated dienes include 5-ethylidene-2-norbornene (ENB); vinylnorbornene (VNB); 1,4-hexadiene; 5-methylene-2-norbornene (MNB); 1,6-octadiene; 5-methyl-1,4-hexadiene; 3,7-dimethyl-1,6-octadiene; 1,3-cyclopentadiene; 1,4-cyclohexadiene; dicyclopentadiene (DCPD); and the like.

Butyl rubbers are also useful in the compositions of the invention. As used in the specification and claims, the term "butyl rubber" includes copolymers of an isoolefin and a conjugated diene, terpolymers of an isoolefin, a conjugated diene and a divinyl aromatic monomer, and the halogenated derivatives of such copolymers and terpolymers. The useful butyl rubber copolymers comprise a major portion of isoolefin and a minor amount, usually less than 30 wt %, of a conjugated diene, and are preferably halogenated, e.g., brominated, to facilitate curing. The preferred copolymers comprise about 85–99.5 wt % of a $C_{4-7}$ isoolefin such as isobutylene and about 15.05 wt % of a multiolefin of 4–14 carbon atoms, such as isoprene, butadiene, dimethyl butadiene and piperylene. Commercial butyl rubber, useful in the invention, is a copolymer of isobutylene and minor amounts of isoprene. Other butyl co- and terpolymer rubbers are illustrated by the description in U.S. Pat. No. 4,916,180, which is fully incorporated herein by this reference Another suitable copolymer within the scope of the olefinic rubber of the present invention is a copolymer of a $C_{4-7}$ isomonoolefin and a paraalkylstyrene, and preferably a halogenated derivative thereof. The amount of halogen in the copolymer, predominantly present as benzylic halogen, is from about 0.1 to about 10 wt. %. A preferred example is the brominated copolymer of isobutylene and paramethylstyrene. These copolymers are more fully described in U.S. Pat. No. 5,162,445, which is fully incorporated herein by reference.

Another olefinic rubber class which may be used are diolefins such as polybutadiene as well as elastomeric random copolymers of butadiene with less than 50 wt % of styrene or acrylonitrile. Other suitable diolefin materials include natural rubber or synthetic polyisoprene. Mixtures comprising two or more of the olefinic rubbers may also be used. Depending upon the desired application, the amount of olefinic rubber present in the composition may range from about 10 to about 90 wt % of the total polymer content of the composition. In most applications and particularly where the rubber component is dynamically vulcanized, the rubber component will constitute less than 70 wt %, more preferably less than 50 wt %, and most preferably about 10–40 wt % of the total polymer content of the composition.

Additives

The compositions of the invention may include plasticizers, curatives and may also include reinforcing and non-reinforcing fillers, antioxidants, stabilizers, rubber, processing oil, plasticizers, extender oils, lubricants, antiblocking agents, anti-static agents, waxes, foaming agents, pigments, flame retardants and other processing aids known in the rubber compounding art. Such additives can comprise up to about 50 wt % of the total composition. Fillers and extenders which can be utilized include conventional inorganics such as calcium carbonate, clays, silica, talc titanium dioxide, carbon black and the like. The rubber processing oils generally are paraffinic, naphthenic or aromatic oils derived from petroleum fractions, but are preferably paraffinic. The type will be that ordinarily used in conjunction with the specific rubber or rubbers present in the composition, and the quantity based on the total rubber content may range from zero up to 1–200 parts by weight per hundred rubber (phr). Plasticizers such as trimellitate esters or aliphatic esters may also be present in the composition.

Processing

The olefin rubber component of the thermoplastic elastomer is generally present as small, i.e., micro-size particles within a continuous plastic matrix, although a co-continuous morphology or a phase inversion is also possible depending on the amount of rubber relative to plastic, and the cure system or degree of cure of the rubber. The rubber may be at least partially crosslinked, and preferably is completely or fully crosslinked. The partial or complete crosslinking can be achieved by adding an appropriate rubber curative to the blend of thermoplastic polymer and rubber and vulcanizing the rubber to the desired degree under conventional vulcanizing conditions. However, it is preferred that the rubber be crosslinked by the process of dynamic vulcanization. As used in the specification and claims, the term "dynamic vulcanziation" means a vulcanization or curing process for a rubber contained in a thermoplastic elastomer composition, wherein the rubber is vulcanized under conditions of high shear at a temperature above the melting point of the component thermoplastic. The rubber is thus simultaneously crosslinked and dispersed as fine particles within the matrix thermoplastic, although as noted above other morphologies may also exist. Dynamic vulcanization is effected by mixing the thermoplastic elastomer components at elevated temperature in conventional mixing equipment such as roll mills, Banbury mixers, Brabender mixers, continuous mixers, mixing extruders and the like. The unique characteristic of dynamically cured compositions is that, notwithstanding the fact that the rubber component is partially or fully cured, the compositions can be processed and reprocessed by conventional plastic processing techniques such as extrusion, injection molding, blow molding, and compression molding. Scrap or flashing can be salvaged and reprocessed.

Those ordinarily skilled in the art will appreciate the appropriate quantities, types of cure systems, and vulcanization conditions required to carry out the vulcanization of the rubber. The rubber can be vulcanized using varying amounts of curative, varying temperatures and varying time of cure in order to obtain the optimum crosslinking desired. Any known cure system for the rubber can be used, so long as it is suitable under the vulcanization conditions with the specific olefinic rubber or combination of rubbers being used and with the thermoplastic component. These curatives include sulfur, sulfur donors, metal oxides, resin systems, peroxide-based systems, hydrosilation curatives containing platinum or peroxide catalysts, and the like, both with and without accelerators and co-agents. Such cure systems are well known in the art and literature of vulcanization of elastomers.

The terms "full vulcanized" and "completely vulcanized" mean that the rubber component to be vulcanized has been cured to a state in which the elastomeric properties of the crosslinked rubber are similar to those of the rubber in its conventional vulcanized state, apart from the thermoplastic elastomer composition. The degree of cure can be described in terms of gel content or, conversely, extractable components. Alternatively the degree of cure may be expressed in terms of crosslink density. All of these descriptions are well known in the art as for example disclosed in U.S. Pat. Nos. 5,100,947 and 5,157,081, both of which are fully incorporated herein by reference.

Melt processing temperatures will generally range from above the melting point of the highest melting polymer present in the TPE composition up to about 300° C. Preferred processing temperatures will range from about 140° C. up to 250° C., more preferably from about 150° C. up to 225° C.

The following examples are illustrative of the invention. A number of dynamically vulcanized compositions as illustrated in Tables II, IV, V, VI, and VII were prepared by melt mixing a mixture of olefinic rubber, propylene polymer, processing oil, curatives and additives as shown in these tables and curing the composition in situ in a high shear mixing device at an elevated temperature of about 200° C. Table I identifies the various propylene polymers utilized in these examples. Polypropylenes identified as PP-1 through PP-8 and PP-13 through PP-16 have MWD and MFR values which are outside the greater than 5.5–20 and 0.5 to 5 dg/min. range respectively, while PP-9 through PP-12 have values within these ranges. Most of these polypropylenes are commercially available materials except as follows:

PP-9 is a polypropylene mixture made in a three-stage reactor and comprising 45 wt % of a 34 dg/min. MFR polypropylene, 33 wt % of a 1.0 dg/min. polypropylene and 22 wt % of a 0.6 dg/min. MFR polypropylene.

PP-10 is a polypropylene mixture made by blending 50 wt % of a 400 dg/min. MFR polypropylene and 50 wt % of a 0.2 dg/min. MFR polypropylene.

PP-11 is a polypropylene mixture made by blending 23.5 wt % of a 400 dg/min. MFR polypropylene, 17 wt % of a 57 dg/min. MFR polypropylene and 59.5 wt % of a 0.33 dg/min. MFR polypropylene.

Formulations identified by "c" numbers in the table headings are control formulations outside the scope of the invention; formulations identified as EX-1 through EX-10 are within the scope of the invention.

Physical and mechanical properties of each of the cured compositions were measured by the procedures shown in Table VIII.

Physical and mechanical properties of the various control vulcanizates and vulcanizates of the invention are compared in Tables III–VII. In those cases where the controls exhibit similar or better spiral flow, e.g., C-10, C-12, C-15, C-30 and C-32, the data show that good spiral flow is achieved at the expense of one or more mechanical properties such as melt strength (extensional viscosity), tensile strength, elongation, extrusion surface roughness and shear viscosity as measured by automatic capillary rheometer (ACR).

Thus, the use of broad MWD polypropylenes as components of DVA compositions in accordance with this invention provide compositions having excellent processability while still maintaining an excellent balance of engineering properties such as tensile strength, melt strength, modulus and elongation.

While preferred embodiments of the invention have been disclosed in detail, it should be understood by those skilled in the art that various other modifications may be made to the illustrated embodiments without departing from the scope and spirit of the invention as described in the specification and defined in the appended claims.

TABLE I

Characterization of Various Polypropylenes

| Polypropylene Number | Catalyst | Mw g/mole | Mn g/mole | MWD GPC | MWD Rheology | MFR dg/min |
|---|---|---|---|---|---|---|
| PP-1 | Ziegler-Natta | 588,150 | 119,100 | 4.93 | 5.0 | 0.8 |
| PP-2 | Ziegler-Natta | 552,980 | 143,560 | 3.85 | 4.0 | 0.7 |
| PP-3 | metallocene | 186,888 | 102,203 | 1.83 | 2.0 | 10 |
| PP-4 | Ziegler-Natta | 196,584 | 39,742 | 4.95 | 5.0 | 11.4 |
| PP-5 | Ziegler-Natta | 158,785 | 49,524 | 3.21 | 4.2 | 20 |
| PP-6 | metallocene | 282,614 | 80,335 | 3.52 | 4.1 | 2.9 |
| PP-7 | Ziegler-Natta | 213,904 | 34,520 | 6.19 | 6.0 | 5.5 |
| PP-8 | Ziegler-Natta | 387,927 | 108,691 | 3.56 | 4.6 | 1.88 |
| PP-9 | Ziegler-Natta | 338,627 | 40,131 | 8.44 | 6.94 | 3.6 |
| PP-10 | Ziegler-Natta | 309,075 | 25,053 | 12.34 | 10.7 | 2.2 |
| PP-11 | Ziegler-Natta | — | — | — | 10.2 | 1.6 |
| PP-12 | Ziegler-Natta | 591,600 | 58,000 | 10.2 | 9.3 | 0.9 |
| PP-13 | Ziegler-Natta | 382,800 | 103,460 | 3.7 | 3.5 | 4 |
| PP-14 | Ziegler-Natta | 379,100 | 7,350 | 5.2 | 4.8 | 1.8 |
| PP-15 | Ziegler-Natta | 452,700 | 133,140 | 3.4 | 3.9 | 0.43 |
| PP-16 | Ziegler-Natta | 332,600 | 72,300 | 4.6 | 4.7 | 1.7 |

TABLE II

EFFECT OF NEW BROAD MWD POLYPROPYLENES ON PROPERTIES OF DVAS

| Example | C-1 | C-2 | C-3 | C-4 | C-5 | C-6 | C-7 | C-8 | C-9 | EX-1 | EX-2 | C-10 |
|---|---|---|---|---|---|---|---|---|---|---|---|---|
| TPE Composition (Parts by Weight) | | | | | | | | | | | | |
| EPDM1, C2 = 55%, ENB = 5%, ML(1 + 4) = 90 | 100 | 100 | 100 | 100 | 100 | 100 | 100 | 100 | 100 | 100 | 100 | 0 |
| EPDM 2, C2 = 60%, ENB = 4.5%, ML(1 + 4) = 63 | 0 | 0 | 0 | 0 | 0 | 0 | 0 | 0 | 0 | 0 | 0 | 175 |
| 2 ZnO/1.5 SnCl2 BLEND/(5 Wax in Example C10) | 3.5 | 3.5 | 3.5 | 3.5 | 3.5 | 3.5 | 3.5 | 3.5 | 3.5 | 3.5 | 3.5 | 8.5 |
| 22.6 Black Concentrate/12 clay | 0 | 0 | 0 | 0 | 0 | 0 | 0 | 0 | 0 | 0 | 0 | 32.6 |
| SP-1046 phenolic resin | 1.5 | 5 | 5 | 5 | 5 | 5 | 5 | 5 | 5 | 5 | 5 | 5.3 |
| SUNPAR 150 M | 107 | 107 | 107 | 107 | 107 | 107 | 107 | 107 | 107 | 107 | 107 | 90 |
| PP-2 | 50 | 50 | 50 | 0 | 0 | 0 | 0 | 0 | 0 | 0 | 0 | 0 |
| PP-3 | 0 | 0 | 0 | 50 | 0 | 0 | 0 | 0 | 0 | 0 | 0 | 0 |
| PP-4 | 0 | 0 | 0 | 0 | 50 | 0 | 0 | 0 | 0 | 0 | 0 | 0 |
| PP-5 | 0 | 0 | 0 | 0 | 0 | 50 | 0 | 0 | 0 | 0 | 0 | 0 |
| PP-6 | 0 | 0 | 0 | 0 | 0 | 0 | 50 | 0 | 0 | 0 | 0 | 0 |
| PP-8 | 0 | 0 | 0 | 0 | 0 | 0 | 0 | 50 | 0 | 0 | 0 | 0 |
| PP-7 | 0 | 0 | 0 | 0 | 0 | 0 | 0 | 0 | 50 | 0 | 0 | 0 |
| PP-9 | 0 | 0 | 0 | 0 | 0 | 0 | 0 | 0 | 0 | 50 | 0 | 0 |
| PP-10 | 0 | 0 | 0 | 0 | 0 | 0 | 0 | 0 | 0 | 0 | 50 | 0 |
| PP-13 | 0 | 0 | 0 | 0 | 0 | 0 | 0 | 0 | 0 | 0 | 0 | 63 |
| TOTAL (Parts by Weight) | 262 | 265.5 | 265.5 | 265.5 | 265.5 | 265.5 | 265.5 | 265.5 | 265.5 | 265.5 | 265.5 | 374.4 |
| Cure State | Part. Cure | Full Cure | Full Cure | Full Cure | Full Cure | Full Cure | Full Cure | Full Cure | Full Cure | Full Cure | Full Cure | Full Cure |

TABLE III

Effect of New Broad MWD Polypropylenes on Properties of DVAs

| Example | C-1 | C-2 | C-3 | C-4 | C-5 | C-6 |
|---|---|---|---|---|---|---|
| Polypropylene Identification Number | PP-2 | PP-2 | PP-2 | PP-3 | PP-4 | PP-6 |
| Specific Gravity | 0.876 | 0.876 | 0.883 | 0.882 | 0.876 | 0.877 |
| ACR, Viscosity at 190 C. (poise) | 1043 | 2112 | — | 1359 | 890 | 1300 |
| ACR, Viscosity at 204 C. (poise) | 547 | 917 | 753 | 749 | 466 | 804 |
| ACR, Viscosity at 210 C. (poise) | 480 | 840 | — | 1066 | 404 | 631 |
| Extensional Viscosity at 190 C. (MPa s) | 0.0866 | 0.155 | 0.179 | 0.0753 | 0.0868 | 0.0532 |
| Spiral Flow at 400 F. at 950 psi (Mold T = 100 F.) (in) | 25 | 21 | 20 | 18 | 27 | 22 |
| Extrusion Surface Roughness, Ra (Microns) | 403 | 678 | 676 | 488 | 191 | 124 |
| Hardness, (Shore A) | 62 | 65 | 68 | 59 | 63 | 65 |
| Stress at 100% strain, (MPa) | | | | | | |
| 23° C. | | 3.08 | 3.78 | 2.99 | 2.85 | 3.16 | 3.14 |
| 125° C. | | 0.82 | 1.33 | — | 0.80 | 1.26 | 1.11 |
| Tensile Strength, (MPa) | | | | | | |
| 23° C. | | 6.01 | 8.55 | 6.19 | 6.26 | 7.16 | 7.48 |
| 125° C. | | 2.21 | 3.39 | — | 1.70 | 2.32 | 2.24 |
| Elongation at break, (%) | | | | | | |
| 23° C. | | 466 | 378 | 328 | 344 | 363 | 367 |
| 125° C. | | 650 | 354 | — | 296 | 290 | 333 |
| Toughness, (MPa) | | | | | | |
| 23° C. | | 19.22 | 19.28 | 12.62 | 12.84 | 15.43 | 15.84 |
| 125° C. | | 8.22 | 6.51 | — | 2.69 | 3.85 | 3.58 |
| Tension Set, %, | 20 | 15 | 15 | 10 | 13 | 10 |
| Wt. Gain, 24 h at 125 C. (%) | 198 | 124 | 129 | Disintegrated | 128 | 129 |

| Example | C-7 | C-8 | C-9 | EX-1 | EX-2 | C-10 |
|---|---|---|---|---|---|---|
| Polypropylene Identification Number | PP-6 | PP-8 | PP-7 | PP-9 | PP-10 | PP-13 |
| Specific Gravity | 0.878 | 0.886 | 0.878 | 0.879 | 0.882 | 0.91 |
| ACR, Viscosity at 190 C. (poise) | 1396 | — | 934 | 1097 | 1088 | |
| ACR, Viscosity at 204 C. (poise) | 730 | 485 | 448 | 631 | 458 | 70 |
| ACR, Viscosity at 210 C. (poise) | 822 | — | 392 | 614 | 463 | |
| Extensional Viscosity at 190 C. (MPa s) | 0.0836 | 0.141 | 0.075 | 0.147 | 0.17 | 0.0223 |
| Spiral Flow at 400 F. at 950 psi (Mold T = 100 F.) (in) | 20 | 25 | 25 | 27 | 29 | 42 |
| Extrusion Surface Roughness, Ra (Microns) | 247 | 488 | 232 | 278 | 266 | 60 |
| Hardness, (Shore A) | 62 | 70 | 62 | 63 | 68 | 62 |
| Stress at 100% strain, (MPa) | | | | | | |
| 23° C. | 3.06 | 2.89 | 3.03 | 3.48 | 3.46 | 2.34 |
| 125° C. | 0.99 | — | 1.08 | 1.27 | 1.16 | 0.54 |

TABLE III-continued

Effect of New Broad MWD Polypropylenes on Properties of DVAs

| | | | | | | |
|---|---|---|---|---|---|---|
| Tensile Strength, (MPa) | | | | | | |
| 23° C. | 8.47 | 6.47 | 6.56 | 6.69 | 6.47 | 4.52 |
| 125° C. | 2.61 | — | 2.23 | 2.40 | 2.32 | 1.10 |
| Elongation at break, (%) | | | | | | |
| 23° C. | 420 | 330 | 357 | 352 | 365 | 340 |
| 125° C. | 331 | — | 310 | 322 | 357 | 415 |
| Toughness, (MPa) | | | | | | |
| 23° C. | 19.74 | 12.59 | 14.11 | 15.06 | 14.79 | — |
| 125° C. | 4.52 | — | 3.97 | 4.52 | 4.97 | — |
| Tension Set, %, | 10 | 11 | 13 | 15 | 15 | 11 |
| Wt. Gain, 24 h at 125 C. (%) | 214 | 123 | 135 | 441 | 145 | 115 |

Example C-10 uses impact PP copolymer and high level of oil - Approach improves flow but detract from engineering properties, lower tensiles especially at elevated temperatures and very low melt strength

TABLE IV

Effect of Broad MWD Polypropylenes on Physical And Performance Properties

| Example | C-11 | C-12 | C-13 | C-14 | C-15 | C-16 | Ex-3 | Ex-4 | Ex-5 |
|---|---|---|---|---|---|---|---|---|---|
| TPE Composition (Parts by Weight) | | | | | | | | | |
| ZnO/SnCl2 blend | 2/1.26 | 2/1.26 | 2/1.26 | 2/1.26 | 2/1.26 | 2/1.26 | 2/1.26 | 2/1.26 | 2/1.26 |
| EPDM 3, C2 = 66%, ENB = 3.8%, ML(1 + 4) = 51 | 175 | 175 | 175 | 175 | 175 | 175 | 175 | 175 | 175 |
| ICECAP K CLAY | 10 | 10 | 10 | 10 | 10 | 10 | 10 | 10 | 10 |
| SUNOLITE WAX | 5 | 5 | 5 | 5 | 5 | 5 | 5 | 5 | 5 |
| SP-1045, phenolic resin | 4.5 | 4.5 | 4.5 | 4.5 | 4.5 | 4.5 | 4.5 | 4.5 | 4.5 |
| SUNPAR 150 M | 55 | 81 | 55 | 55 | 55 | 55 | 55 | 55 | 55 |
| PP-1, 0.8 MFR | 41 | 0 | 0 | 0 | 0 | 0 | 0 | 0 | 0 |
| PP-2, 0.7 MFR | 0 | 50 | 41 | 41 | 0 | 0 | 0 | 0 | 0 |
| PP-5, 20 MFR | 0 | 0 | 0 | 0 | 41 | 0 | 0 | 0 | 0 |
| PP-8, 1.9 MFR | 0 | 0 | 0 | 0 | 0 | 41 | 0 | 0 | 0 |
| PP-9, 3.6 MFR | 0 | 0 | 0 | 0 | 0 | 0 | 41 | 0 | 0 |
| PP-10, 2.2 MFR | 0 | 0 | 0 | 0 | 0 | 0 | 0 | 41 | 0 |
| PP-11, 1.6 MFR | 0 | 0 | 0 | 0 | 0 | 0 | 0 | 0 | 41 |
| TOTAL (Parts by Weight) | 290.5 | 325.5 | 290.5 | 290.5 | 290.5 | 290.5 | 290.5 | 290.5 | 290.5 |
| POLYPROPYLENE NUMBER | PP-1 | PP-2 | PP-2 | PP-2 | PP-5 | PP-8 | PP-9 | PP-10 | PP-11 |
| HARDNESS, (Shore A) | 59 | 56 | 63 | 54 | 57 | 64 | 61 | 60 | 68 |
| Specific gravity | 0.901 | 0.897 | 0.90 | 0.90 | 0.903 | 0.90 | 0.898 | 0.901 | 0.899 |
| Tensile Strength, (psi) | 688 | 909 | 786 | 619 | 559 | 740 | 686 | 753 | 768 |
| Elongation @ Break, (%) | 353 | 382 | 377 | 420 | 323 | 405 | 384 | 431 | 304 |
| Modulus at 100% elongation, (psi) | 310 | 382 | 350 | 323 | 293 | 305 | 330 | 318 | 596 |
| WT. GAIN, 24 h @ 125 C. (%) | 129 | 75 | 117 | 110 | 107 | 113 | 108 | 102 | 130 |
| ROD DRAW | 3.1 | 4.2 | 2.4 | 3.4 | 2.3 | 3.5 | 2.3 | 3 | — |
| TENSION SET @ 23 C., (%) | 13 | 13 | 13 | 9 | 12 | 9 | 9 | 10 | 15 |
| Compression Set, 22 h @ 100 C. (%) | 48 | 57 | 46 | 45 | 37 | 46 | 46 | 46 | — |
| ACR VISCOSITY, @ 190 C. (poise) | 907 | 314 | 803 | — | 116 | — | 481 | 515 | — |
| ACR VISCOSITY, @ 204 C. (poise) | 366 | 132 | 300 | 370 | 105 | 169 | 250 | 225 | 309 |
| Extrusion Surface Rating, (Microns) | 124 | 85 | 118 | 185 | 127 | 121 | 60 | 57 | 127 |
| Spiral Flow, @ 400 F. @ 950 psi (in) | 26 | 33 | 25 | 25 | 33 | 32 | 33 | 34 | 33 |
| Extensional Viscosity, @ 190 C., (MPa s) | 0.131 | 0.079 | 0.109 | 0.128 | 0.0203 | 0.0729 | 0.133 | 0.158 | 14.5 |
| FOAMABILITY CHARACTERISTICS | | | | | | | | | |
| SPECIFIC GRAVITY, FOAMED PROFILE | 0.35 | — | 0.55 | 0.4 | 0.68 | 0.3 | — | 0.14 | — |
| PROFILE DIAMETER | 0.22 | — | 0.17 | 0.185 | 0.113 | 0.217 | — | 0.332 | — |

TPE Example C-12 - More Oil, more PP: improve flow but detraction from rubbery behavior. e.g. higher compression set and lower melting point

TABLE V

Effect of MFR and MWD of PP on properties of 'hard' TPE grades

| | | | | | Invention | | | | |
|---|---|---|---|---|---|---|---|---|---|
| Example | C-17 | C-18 | C-19 | C-20 | Ex-6 | Ex-7 | C-21 | C-22 | C-23 |
| TPE Composition (Parts by Weight) | | | | | | | | | |
| EPDM 3, C2 = 66%; ENB = 3.8%; ML(1 + 4) = 51 | 175 | 175 | 175 | 175 | 175 | 175 | 175 | 175 | 175 |

TABLE V-continued

Effect of MFR and MWD of PP on properties of 'hard' TPE grades

| Example | | | | | Invention | | | | |
|---|---|---|---|---|---|---|---|---|---|
| | C-17 | C-18 | C-19 | C-20 | Ex-6 | Ex-7 | C-21 | C-22 | C-23 |
| Clay | 10 | 10 | 10 | 10 | 10 | 10 | 10 | 10 | 10 |
| Wax | 5 | 5 | 5 | 5 | 5 | 5 | 5 | 5 | 5 |
| SP1045 | 6 | 6 | 6 | 6 | 6 | 6 | 6 | 6 | 6 |
| ZnO, 2; SnCl2 1.26 | 3.26 | 3.26 | 3.26 | 3.26 | 3.26 | 3.26 | 3.26 | 3.26 | 3.26 |
| PP-1, 0.8 MFR, 5.0 MWD | 223 | 223 | 0 | 0 | 0 | 0 | 0 | 0 | 0 |
| PP-2, 0.7 MFR, 3.9 MWD | 0 | 0 | 223 | 223 | 0 | 0 | 0 | 0 | 0 |
| PP-10, 2.2 MFR, 10.7 MWD | 0 | 0 | 0 | 0 | 223 | 0 | 0 | 0 | 0 |
| PP-12, 0.9 MFR, 9.3 MWD | 0 | 0 | 0 | 0 | 0 | 223 | 0 | 0 | 0 |
| PP-14, 1.78 MFR, 4.8 MWD | 0 | 0 | 0 | 0 | 0 | 0 | 223 | 0 | 0 |
| PP-15, 0.43 MFR, 3.9 MWD | 0 | 0 | 0 | 0 | 0 | 0 | 0 | 223 | 0 |
| PP-16, 1.65 MFR, 4.7 MWD | 0 | 0 | 0 | 0 | 0 | 0 | 0 | 0 | 223 |
| Total (Parts by Weight) | 422.26 | 422.26 | 422.26 | 422.26 | 422.26 | 422.26 | 422.26 | 422.26 | 422.26 |
| Hardness, (Shore D) | 38 | 39 | 40 | 40 | 38 | 39 | 37 | 38 | 39 |
| Tensile Strength, (psi) | 2582 | 2770 | 2698 | 2712 | 2282 | 2582 | 2379 | 2872 | 2698 |
| Elongation at Break, (%) | 551 | 547 | 555 | 541 | 532 | 523 | 555 | 596 | 555 |
| Modulus at 100% elongation, (psi) | 1299 | 1334 | 1310 | 1334 | 1489 | 1479 | 1212 | 1347 | 1321 |
| WT. GAIN, 24 h at 125 C. in ASTM Fluid 3, (%) | 46 | 45 | 48 | 44 | 48 | 51 | 56 | 44 | 45 |
| ACR VISCOSITY at 204 C., (poise) | 560 | 724 | 883 | 774 | 236 | 688 | 316 | 1023 | 360 |
| Extrusion Surface Rating, micron | 46 | 107 | 39 | 109 | 35 | 105 | 66 | 43 | 39 |
| Spiral Flow, @ 950 psi @ 400 F., (in) | 24 | 23 | 24 | 22 | 38 | 27 | 30 | 21 | 29 |
| TENSION SET, % | 39.5 | 40 | 39 | 40 | 42 | 42.5 | — | 40.5 | 44.5 |
| Compression Set, % | 54 | 56 | 52 | 57 | 59 | 58 | 54 | 50 | 55 |

TABLE VI

TO EVALUATE VARIOUS PP USING BUTYL 268 RUBBER.

| Example | C-24 | C-25 | C-26 | Ex-8 | Ex-9 | C-27 |
|---|---|---|---|---|---|---|
| TPE Composition (Parts by Weight) | | | | | | |
| BUTYL 268 RUBBER | 100 | 100 | 100 | 100 | 100 | 100 |
| ICECAP K CLAY | 9 | 9 | 9 | 9 | 9 | 9 |
| POWDER BLEND(ZnO/SnCl2) | 5 | 5 | 5 | 5 | 5 | 5 |
| SP-1045 | 5 | 5 | 5 | 5 | 5 | 5 |
| SUNPAR 150 M | 100 | 100 | 100 | 100 | 100 | 100 |
| PP-2, 51S07A | 60 | 0 | 0 | 0 | 0 | 0 |
| PP-1, D008M | 0 | 60 | 0 | 0 | 0 | 0 |
| PP-5, FP200F | 0 | 0 | 60 | 0 | 0 | 0 |
| PP-9, 20045-20-001(PLTD1130) | 0 | 0 | 0 | 60 | 0 | 0 |
| PP-10, 20045-20-003 | 0 | 0 | 0 | 0 | 60 | 0 |
| PP-8, 4782 | 0 | 0 | 0 | 0 | 0 | 60 |
| TOTAL (Parts by Weight) | 279 | 279 | 279 | 279 | 279 | 279 |
| Hardness, (Shore A) | 82 | 87 | 82 | 87 | 84 | 84 |
| Specific Gravity | 0.972 | 0.972 | 0.962 | 0.97 | 0.974 | 0.972 |
| Ultimate Tensile Strength, (psi) | 1115 | 1349 | 780 | 1087 | 1058 | 1248 |
| Elongation at Break, (%) | 441 | 535 | 399 | 494 | 507 | 530 |
| Modulus at 100% Elongation, (psi) | 669 | 600 | 531 | 774 | 605 | 758 |
| Processability Characteristics | | | | | | |
| ACR VISCOSITY at 204 C., (poise) | 364 | 335 | 74 | 211 | 278 | 200 |
| Extrusion Surface Rating, (Micron) | 391 | 909 | 140 | 133 | 232 | 278 |
| Spiral Flow, at 950 psi at 400 F., (ins) | 28 | 27 | 45 | 39 | 33 | 34 |
| Tension Set, (%) | 35 | 34 | 37 | 35 | 35 | 37 |

TABLE VII

EFFECT OF BROAD MWD POLYPROPYLENES ON PHYSICAL AND PERFORMANCE PROPERTIES OF TPEa

| Examples | C-28 | C-29 | C-30 | Ex-10 | C-32 |
|---|---|---|---|---|---|
| Composition (Parts by Weight) | | | | | |
| Oil-extended Rubber Blend (VNB-EPDM, +20 phr clay) | 220 | 220 | 220 | 220 | 220 |
| ICECAP K CLAY | 22 | 22 | 22 | 22 | 22 |
| Silicon Hydride 2-2822 (Dow Corning) | 2 | 2 | 2 | 2 | 2 |

TABLE VII-continued

EFFECT OF BROAD MWD POLYPROPYLENES ON PHYSICAL AND PERFORMANCE PROPERTIES OF TPEa

| Examples | C-28 | C-29 | C-30 | Ex-10 | C-32 |
|---|---|---|---|---|---|
| Platinum Catalyst, PC 085(0.11%) | 3.8 | 3.8 | 3.8 | 3.8 | 3.8 |
| SUNPAR 150 LW | 56 | 56 | 56 | 56 | 56 |
| STABILIZER SLURRY | 12 | 12 | 12 | 12 | 12 |
| PP-2, 0.7 MFR | 50 | 0 | 0 | 0 | 0 |
| PP-1, 0.8 MFR | 0 | 50 | 0 | 0 | 0 |
| PP-5, 20 MFR | 0 | 0 | 50 | 0 | 0 |
| PP-9, 3.6 MFR | 0 | 0 | 0 | 50 | 0 |
| PP-8, 1.9 MFR | 0 | 0 | 0 | 0 | 50 |
| TOTAL (Parts by Weight) | 365.8 | 365.8 | 365.8 | 365.8 | 365.8 |
| HARDNESS, (SHORE A) | 69A | 68A | 62A | 66A | 66A |
| SPECIFIC GRAVITY | 0.951 | 0.952 | 0.953 | 0.954 | 0.945 |
| TENSILE STRENGTH, (Mpa) | 6.05 | 6.25 | 4.84 | 5.26 | 5.53 |
| ELONGATIION AT BREAK, (%) | 521 | 562 | 454 | 468 | 522 |
| Modulus at 100% elongation, (MPa) | 2.34 | 2.34 | 2.19 | 2.04 | 2.22 |
| WT. GAIN, %, 24 h at 125 C., Repeat | 105 | 115 | 113 | 107 | 110 |
| ROD DRAW | 2.1 | 2.3 | 2 | 3 | 2.5 |
| COLOR L | 74.91 | 73.96 | 75.6 | 76.11 | 75.37 |
| COLOR a | −1.24 | −1.04 | −1.17 | −1.03 | −0.91 |
| COLOR b | 7.5 | 6.91 | 7.37 | 8.26 | 8.74 |
| COMPRESSION SET, 22 H AT 100 C. (%) | 50 | 46 | 47 | 46 | 47 |
| TENSION SET, (%) | 12 | 12 | 11 | 9 | 11 |
| Spiral Flow at 950 psi at 400 F. (in) | 27 | 28 | 31 | 29 | 29 |
| Extrusion Surface Rating, (micron) | 47 | 53 | 45 | 58 | 49 |
| ACR VISCOSITY, at 204 C. (poise) | 320 | 287 | 206 | 326 | 232 |
| EXTENSIONAL VISCOSITY AT 190 C. (MPa s) | 0.0586 | 0.069 | 0.0369 | 0.118 | 0.0629 |
| FOAMABILITY | | | | Best | |
| S.G. | 0.96 | 0.98 | — | 0.21 | 0.39 |
| PROFILE DIAMETER, (in) | 0.146 | 0.151 | — | 0.275 | 0.2 |

**Cannot Measure

TABLE VIII

Test Methods

| Property | Units | Procedure |
|---|---|---|
| Specific Gravity | — | ASTM D-792 |
| Hardness | Shore A or Shore D | ASTM D-2240 |
| Tensile Strength | MPa or psi | ASTM D-412 |
| Elongation at Break | % | ASTM D-412 |
| 100% Modulus | MPa or psi | ASTM D-412 |
| Compression Set | % | ASTM D-395 (Method B) |
| Tension Set | % | ASTM D-412 |
| Weight Gain | % | ASTM D-471 |
| Extrusion Surface Profilometer | micron | TPE-0106 |
| ACR Viscosity | poise | TPE-0137 |
| Extrusion Rod Draw Ratio | — | TPE-0168 |
| Spiral Flow | ins | TPE-0032 |

What is claimed is:

1. A thermoplastic elastomer composition comprising a mixture of:
   a) a polypropylene polymer composition having a melt flow rate in the range of from about 0.5 to about 5 dg/10 min. and a molecular weight distribution Mw/Mn of greater than 5.5 up to about 20; and
   b) an olefinic rubber, wherein said olefinic rubber is present in said composition at a level of about 10 to 90 wt % based on the total polymer content of said composition.

2. The composition of claim 1 wherein said polypropylene polymer composition has a molecular weight distribution in the range of about 6 to about 15.

3. The composition of claim 1 wherein said polypropylene polymer composition has a melt flow rate in the range of about 0.5 to about 4 dg/min.

4. The composition of claim 1 wherein said polypropylene polymer composition comprises a mixture of at least two polypropylenes, one having a melt flow rate of less than 0.5 dg/min. and at least one other having a melt flow rate greater than 3 dg/min.

5. The composition of claim 1 wherein said polypropylene polymer composition comprises a mixture of at least three polypropylenes, one having a melt flow rate less than 0.1 dg/min., a second having a melt flow rate greater than 1 dg/min. and a third having a melt flow rate greater than 4 dg/min.

6. The composition of claim 1 wherein said polypropylene polymer composition comprises polypropylene homopolymer.

7. The composition of claim 1 wherein said olefinic rubber is selected from the group consisting of ethylene/propylene copolymers. ethylene/propylene/non-conjugated diene terpolymers, isobutylene copolymers, diolefin polymers and mixture thereof.

8. The composition of claim 1 wherein said olefinic rubber is at least partially crosslinked by dynamic vulcanization.

9. The composition of claim 1 which further contains an additional thermoplastic polymer component different from component (a).

10. The composition of claim 1 which further contains from about 1 to 200 parts by weight of rubber processing oil per 100 parts by weight of said olefinic rubber.

11. The composition of claim 1 which further contains a curing system for said olefinic rubber.

* * * * *